United States Patent [19]
Thompson et al.

[11] Patent Number: 5,992,915
[45] Date of Patent: Nov. 30, 1999

[54] LINER FOR A TRUCK BED HAVING A FIFTH WHEEL MOUNT

[75] Inventors: Jack L. Thompson, Monroe, Mich.; Phillip L. Emery, Portage, Wis.

[73] Assignee: Penda Corporation, Portage, Wis.

[21] Appl. No.: 09/286,695

[22] Filed: Apr. 6, 1999

[51] Int. Cl.[6] .................................................. B60R 13/01
[52] U.S. Cl. ............................................................ 296/39.2
[58] Field of Search ............................................ 296/39.2

[56] References Cited

U.S. PATENT DOCUMENTS

| | | |
|---|---|---|
| 4,181,349 | 1/1980 | Nix et al. . |
| 4,188,058 | 2/1980 | Resa et al. . |
| 4,333,678 | 6/1982 | Munoz et al. ........................ 296/39.2 |
| 4,592,583 | 6/1986 | Dresen et al. . |
| 4,750,776 | 6/1988 | Barben . |
| 5,013,060 | 5/1991 | Van Andel et al. . |
| 5,137,322 | 8/1992 | Muirhead . |
| 5,421,634 | 6/1995 | Hackett . |
| 5,673,956 | 10/1997 | Emery . |
| 5,735,565 | 4/1998 | Papai et al. . |

OTHER PUBLICATIONS

Exhibit A—Photograph of front section of Durakon All Star bedliner, bedliner dated prior to Aug. 18, 1997.

*Primary Examiner*—Gary C. Hoge
*Attorney, Agent, or Firm*—Lathrop & Clark LLP

[57] ABSTRACT

A thermoformed thermoplastic bedliner has a ribbed bottom wall which overlies the floor of a truck cargo bed. Two side walls extend upwardly from the bottom wall. The ribs extend longitudinally along the bottom wall and terminate at a transverse flat portion. The bedliner can be modified to accommodate mounting of a fifth wheel hitch to the truck frame, either by bolting through the bedliner or by cutting away the transverse flat portion.

17 Claims, 4 Drawing Sheets

LINER FOR A TRUCK BED HAVING A FIFTH WHEEL MOUNT

CROSS REFERENCES TO RELATED APPLICATIONS

STATEMENT AS TO RIGHTS TO INVENTIONS MADE UNDER FEDERALLY SPONSORED RESEARCH AND DEVELOPMENT

BACKGROUND OF THE INVENTION

This invention relates generally to truck bedliners and in particular to thermoformed thermoplastic liners for use on truck beds having fifth wheel mounts.

Although long used in agricultural and commercial applications, pick-up trucks with open cargo beds have also become increasingly popular as personal and family vehicles. The commercial vehicle owner, although concerned with performance and cost effectiveness of the vehicle, often considers the vehicle as a traveling company advertisement or symbol. A neat and well-maintained vehicle is more likely to favorably impress customers. Owners of personal vehicles, while concerned with functionality and efficiency, are also concerned with pride of ownership, personal image, and outward appearances. In addition, the automotive enthusiast desires to maintain his vehicle in as close to a "like new" condition as possible.

Truck bedliners of plastic or rubber are commonly employed to protect the painted metal surfaces of a pick-up truck cargo bed. These truck bedliners are available in a wide variety of configurations to suit the wide variety of available trucks. Bed liners protect the cargo bed from scratching and denting as well as paint fading from exposure to sunlight and elements. One-piece thermoformed thermoplastic truck bedliners provide a cost-effective means of protecting the truck cargo bed.

Because of the thin sheet construction of bedliners, to restrain the twisting and warping of the bottom wall, the bottom wall is formed with an array of parallel longitudinal ribs. In addition to the stiffening benefits of these ribs, they also serve as passageways for the escape of rain water and other liquid collected within the truck bed.

Pick-up trucks may be provided with trailer hitches which, rather than mounting to the rear of the vehicle, are secured to the bed of the truck approximately between the wheel wells. These fifth wheel or goose neck hitches provide greater towing capacity.

Fifth wheel hitches have been mounted to bedliners over the undulating ribs by positioning metal shims, such as round rods beneath or between ribs, and then fastening the fifth wheel hitch to the truck frame directly through the raised ribs.

What is needed is a truck bedliner which readily permits fifth wheel hitch mounting while still providing some level of protection to the truck bed.

SUMMARY OF THE INVENTION

The truck bedliner of this invention has three sets of raised ribs extending longitudinally along the bedliner bottom wall. The boundaries of the raised ribs define two fifth wheel mount transverse portions which extend transversely across the bedliner. These transverse portions may lie entirely adjacent to the truck bed, or may have a ring of flat plastic with interior ribbing, or may have reduced height ribs throughout. The cuts away portions provide access to the truck bed for attaching a fifth wheel hitch when removed. When cut, the edge of the cutaway portion lies more closely against the bedliner surface, providing an attractive appearance. Alternatively, the fifth wheel transverse portions may remain in place, and the fifth wheel hitch may be attached through holes drilled in the transverse portions.

It is an object of the present invention to provide a bedliner allowing access therethrough to a fifth wheel mount in the truck bed.

It is an additional object of the present invention to provide a bedliner to which a fifth wheel hitch can be mounted without the need for metal shims.

Further objects, features, and advantages of the invention will be apparent from the following detailed description when taken in conjunction with the accompanying drawings.

DESCRIPTION OF THE PREFERRED EMBODIMENTS

Figure 1:
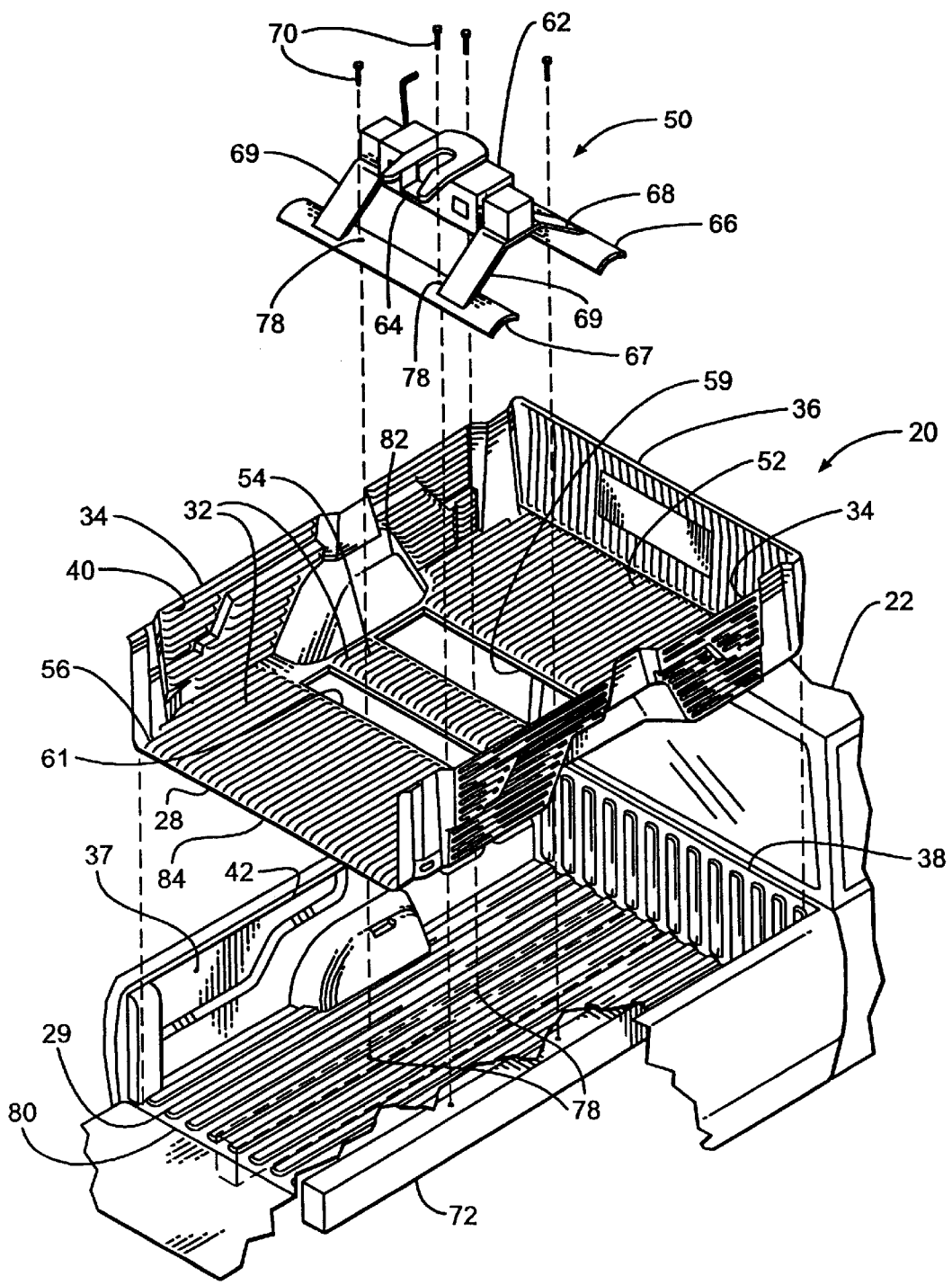
FIG. 1 is an exploded isometric view, partly cut-away, of the bedliner of this invention in relation to a pickup truck bed.

Referring more particularly to FIGS. 1–4, wherein like numbers refer to similar parts, a bedliner 20 is shown in relation to the bed of a conventional pickup truck 22 in FIG. 1. The bedliner 20 is formed from thermoplastic material such as high density polyethylene through the single sheet thermoforming process. In this process a planar sheet of extruded thermoplastic material, for example one about ¼ inch thick, which may be preformed with a pattern on one surface, is heated and then positioned over a vacuum thermoforming mold. A vacuum is drawn on the mold to bring the semi-molten plastic into contact with the mold where it is formed to a desired shape. After the part has at least partly cooled it is removed from the mold and trimmed to its final configuration and any through holes are formed in the part through drilling or routing.

As shown in FIG. 1, the bedliner 20 has a bottom wall 28 which overlies and covers the truck cargo bed floor 29. The bedliner bottom wall 28 extends generally in a horizontal plane, and has a series of inverted U-shaped longitudinal ribs 32 which contribute to the rigidity of the bottom wall, enhance drainage, and provide a receptacle for water beneath a support surface defined by the tops of the ribs. The bedliner 20 has been illustrated as an under-the-rail bedliner, but it should be understood that an over-the-rail liner including the features of this invention may also be formed.

Two side walls 34 extend upwardly from the bedliner bottom wall 28 and may be inclined outwardly from the liner bottom wall to facilitate nesting of multiple bedliners in shipping and storage. The side walls 34 are joined at the front of the bedliner by a liner front wall 36 which extends upwardly from the bedliner bottom wall 28 to cover the truck bed front wall 38. The bedliner side walls are positioned on the interior sides of the truck cargo bed side walls 37 and serve to shield and protect the side walls from soiling and damage. As shown in FIG. 1, each bedliner side wall 34 has an upper margin 40 which engages against a truck cargo bed side wall 37 beneath a truck bed side rail 42.

The bedliner 20 of this invention is formed to cooperate with a truck 22 having a fifth wheel mount 50. Three groups 52, 54, 56 of generally parallel raised ribs 32 extend longitudinally along the bottom wall 28. A first group 52 of raised ribs 32 extends from the front wall 36 rearwardly to a first transverse portion 58. A second group 54 of raised ribs 32 extends rearwardly from the first transverse portion 58 to a second transverse portion 60. A third group 56 of raised ribs 32 extends rearwardly from the second transverse portion 60 to the rear edge 84 of the bedliner. The first transverse portion 58 and second transverse portion extend generally between the wheel wells 82. The first transverse portion 58 and the second transverse portion are preferably formed to lie flat and adjacent the truck bed.

The first transverse portion 58 and second transverse portion 60 are spaced to accommodate a fifth wheel mount. As shown in FIG. 1, a typical fifth wheel mount comprises a body 62 that houses a hitch mechanism 64, two mounting plates 66, 67 that mount against the truck bed 29, and two pairs of legs 68, 69 that extend upwardly from the mounting plates, spacing the hitch body vertically from the truck bed. A first pair of legs 68 extend rearwardly and upwardly from the first mounting plate 66 to the hitch body 62 and a second pair of legs 69 extend upwardly and forwardly from the second mounting plate 67 to the hitch body 62. To secure the fifth wheel 50 to the truck bed, a plurality of bolts 70 extend through the mounting plates 66 and the truck bed floor 29 and connect to a member of the truck frame 72.

The transverse portions may be cut away to mount the hitch, or, as discussed below, the hitch may be bolted through the transverse portions. When the transverse portions are cutaway, the fifth wheel mount is placed in a truck with a bedliner positioned over the truck bed such that the first mounting plate 66 extends transversely across the hole remaining when the first transverse portion 58 is cut away and the second mounting plate 67 extends across the hole remaining when the second transverse portion 60 is cut away. However, because the bedliner 20 may be used for some time before the user chooses to install a fifth wheel hitch 50, the bedliner must still perform effectively when the transverse portions 58, 60 are still intact. The ribs 32 project upwardly above the transverse portions 58, 60, yet to reduce any opportunity for a loaded board to be snubbed or retained on a projecting rib, the ribs may be provided with an approximately 45 degree ramp 88 on any end which adjoins one of the transverse portions 58, 60. These ramped surfaces prevent the ribs from being an obstacle when loading timbers, plywood, or other objects into the bed.

Figure 3:
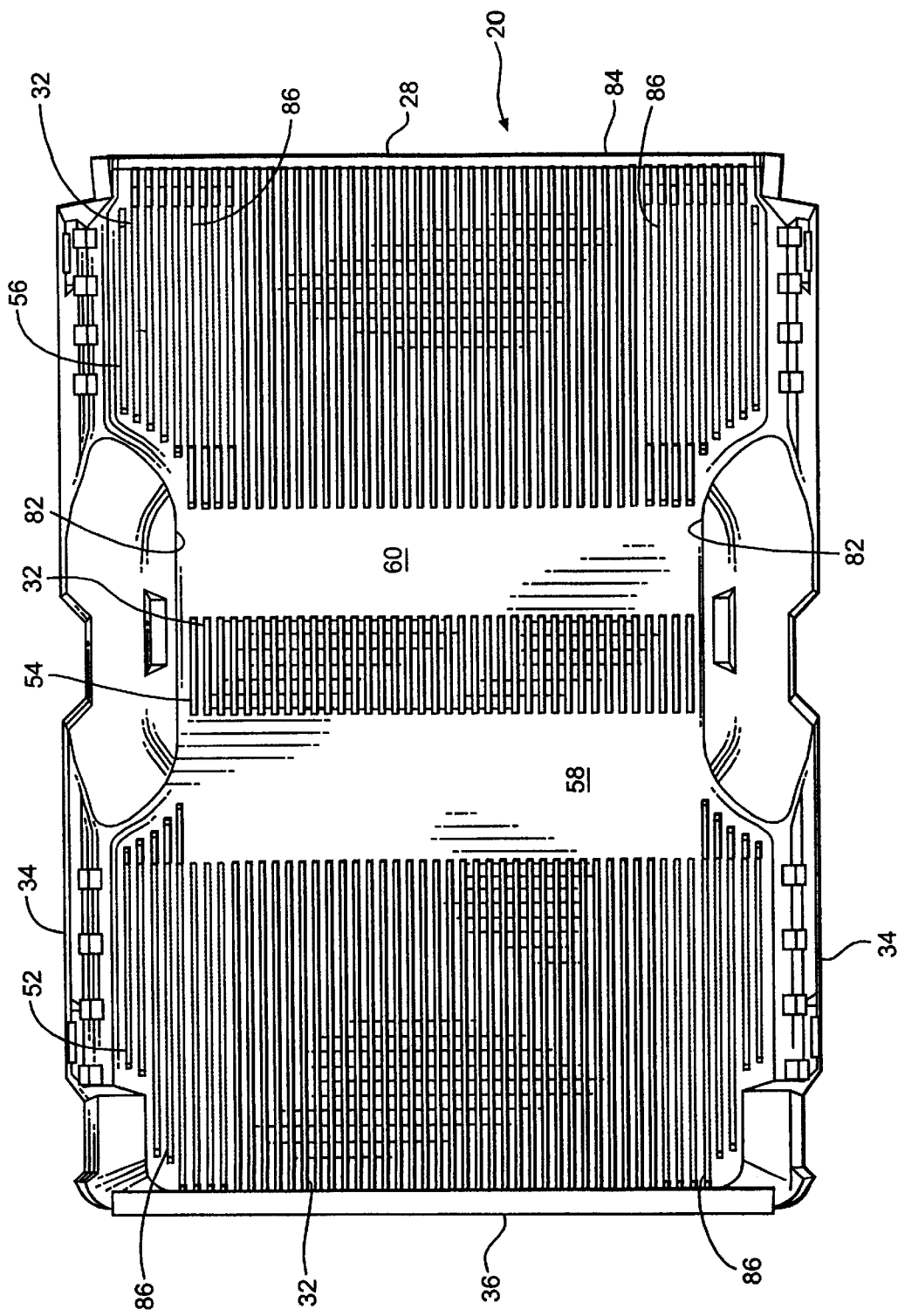
FIG. 3 is a top view of the bedliner of this invention.

As best shown in FIG. 3, the first transverse portion 58 is preferably about fifty percent deeper in the front-to-back direction than the second transverse portion 60. The greater depth of the first transverse portion 58 acts as an auto-tolerancing feature. Because fifth wheel hitches are manufactured by many different makers and come in many different sizes and models, there will be a certain amount of variation in the spacing between the first hitch mounting plate 66 and the second hitch mounting plate 67. The second hitch mounting plate 67 will thus be placed in a hole 61 cut within the narrower second transverse portion 60, and the first hitch mounting plate 66 will be allowed to fall where it will on the first transverse portion 58. The wider depth of the first transverse portion 58 permits an opening 59 to be cut wherever it is called for. Although the first opening 59 will usually be approximately the same size as the second opening 61, the openings have been illustrated as different sizes to better illustrate the different sizes of the transverse portions 58, 60.

Figure 2:
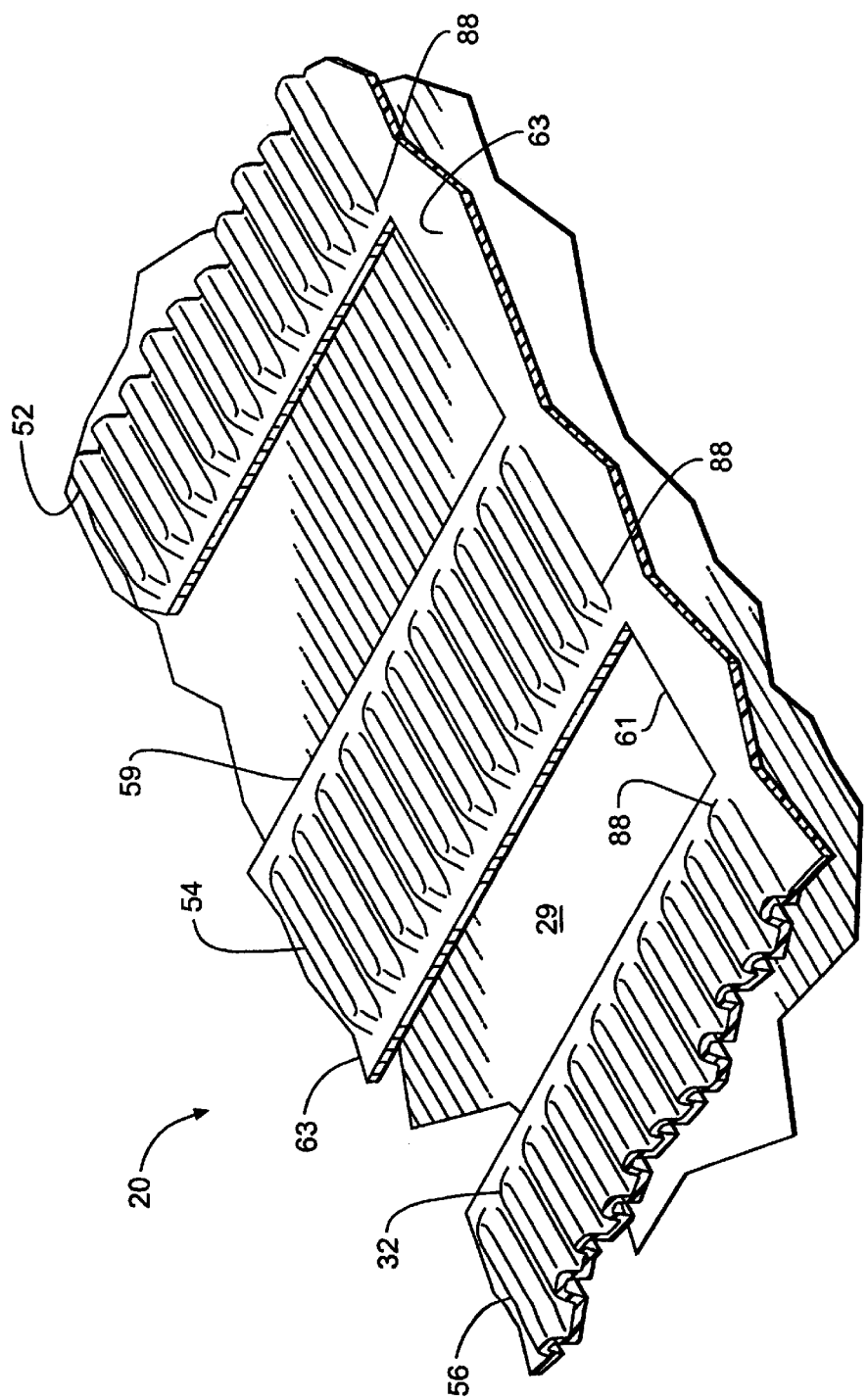
FIG. 2 is a fragmentary isometric view of the bedliner of this invention with cutaway portions removed.

To secure a fifth wheel mount in a truck bed with a bedliner of this invention, a portion of the bedliner bottom wall 28 may be cut away so that the fifth wheel mount 50 may be secured directly to the truck cargo bed 29. As shown in FIG. 2, a first opening 59 is formed by removing a segment of the first transverse portion 58 and a second opening 61 is formed by removing a segment of the second transverse portion 60. The dimensions of the openings 59, 61 are slightly smaller than the corresponding transverse portions 58, 60, so that a ring 63 of flat bedliner material circumscribes the cutaway portions.

The ring 63 of flat bedliner material follows more closely the truck bed bottom wall than the ribbed portions. It should be noted that fifth wheel hitch assemblies vary widely in the footprint of the attachment plates. Hence, depending on the structure of the fifth wheel hitch, different portions of the transverse portions will need to be cut out, ranging from only a small portion, to nearly the entire transverse portion.

Figure 4:
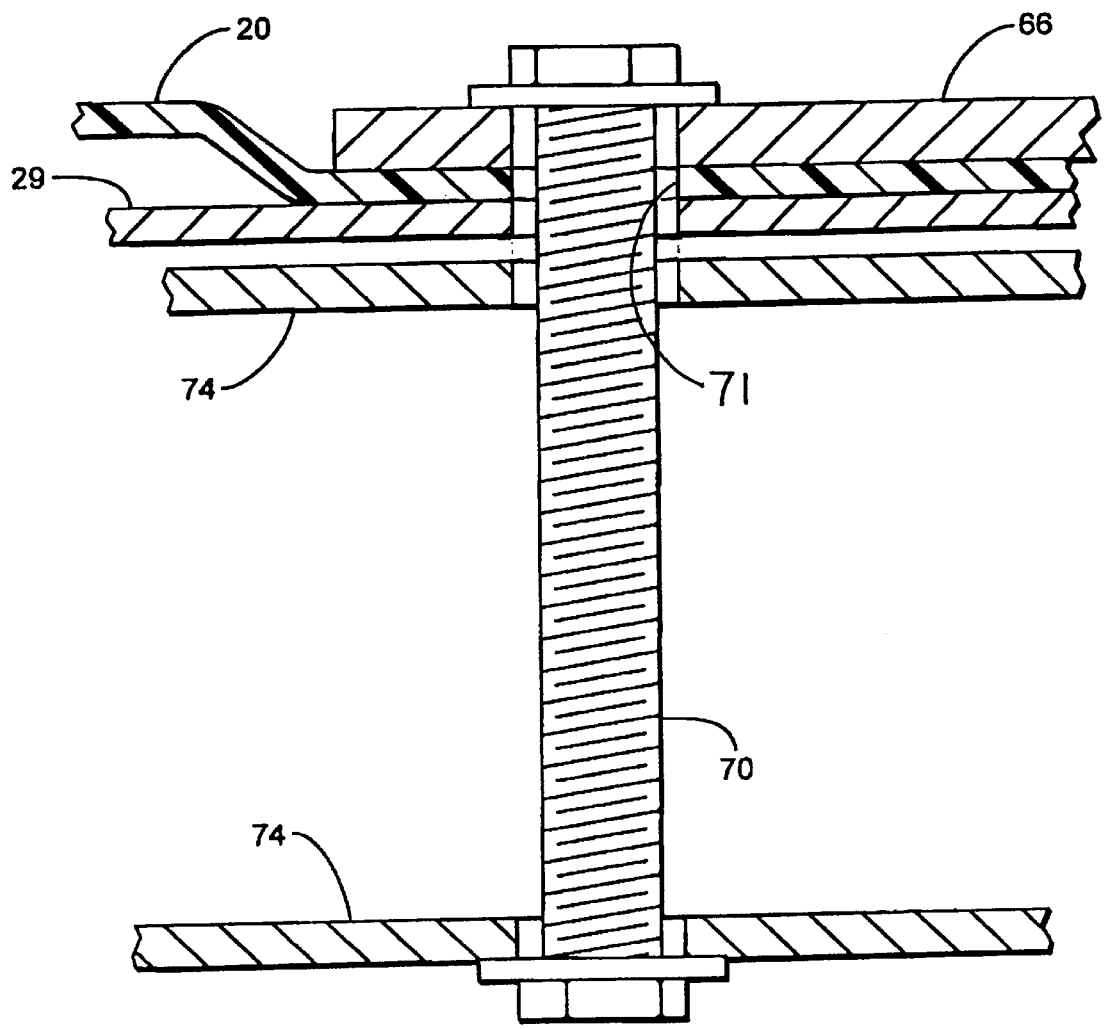
FIG. 4 is a cross-sectional view of the bedliner of FIG. 2 taken through a transverse portion to which a fifth wheel hitch has been mounted.

Alternatively, the fifth wheel hitch may be attached to a frame member 74 of the truck beneath the truck bed by bolting the fifth wheel hitch through bolt holes drilled in the bedliner 20, as shown in FIG. 4. The bolts 70 extend through the hitch mounting plates 66, 67 and then through openings in the transverse portions which define bolt holes 71 in the transverse portions 58, 60 of the bedliner and in the truck bed floor 29 itself, and are secured to a frame member 74.

Alternatively, a single central cut-away portion, rather than multiple transverse flat portions, may be formed to adapt the bedliner for use with a gooseneck hitch. The alternative embodiment bedliner may have a square central cut-away portion, having reduced height ribs, which is removable to accommodate mounting of a gooseneck hitch to the truck bed. The square portion is about one-third the width of the bedliner and is centered between the bedliner wheel wells.

Alternatively, a reduced rib height transverse portion extending between wheel well covers, rather than a flat transverse portion, may be used. When the reduced rib height portion is intact, the ribs provide strength and convey liquids longitudinally in the truck bed to facilitate drainage of the truck bed. When the bed is modified to accommodate a hitch mount, cutting of the reduced height ribs reveals a smaller cross section than cut full-height nibs, so that leakage under the bedliner is reduced.

Alternatively, the bedliner 20 may be provided with one or more portions adapted for being cut away to receive a fifth wheel hitch, in which each of the portions has a central ribbed portion circumscribed by a ringed flat ribless portion to provide a close fit to the bed when cut. The ribs drain water and add structural integrity to the liner when the cut-away portion is not removed, while the ringed flat ribless portion provides a close seal to the truck bed surface when the central ribbed portion is removed.

It should be noted that the bedliner may be formed with reduced height rib regions 86 for cargo containment, as shown in FIG. 3, and disclosed in a co-pending patent application filed on Apr. 6, 1999, entitled Bedliner with Depth Variant Ribs for Load Placement, by Phillip L. Emery, Timothy E. Williams, and Kristin A. Uttech, the disclosure of which is incorporated by reference herein. The reduced height regions 86 have parallel series of rib segments which project upwardly to a height approximately one half the height of the normal height ribs 32. A single rib extending from the front to the rear of the bedliner will have normal height segments which are connected by reduced height segments at angled transitions. To provide for many different sizes of hitches, the removable transverse segments preferably extend fully between the two wheel well covers of the bedliner.

It should be noted that bedliners of the present invention may be formed to provide compatibility with a wide variety of conventional truck beds, in which case the molded liner may take on a general shape which conforms to the dimensions of the particular bed.

The bedliner may be formed to have slip resistant surfaces on both sides, as disclosed in Application Ser. No. 09/144,663, entitled Bedliner With Anti-Slip Under Layer, filed Sep. 1, 1998, and incorporated by reference herein.

It is understood that the invention is not confined to the particular construction and arrangement of parts herein illustrated and described, but embraces all such modified forms thereof as come within the scope of the following claims.

We claim:

1. A one-piece thermoformed thermoplastic truck bedliner for attachment to the bed of a truck, to receive a hitch therein, the bedliner comprising:

a bottom wall having a plurality of parallel ribs which extend upwardly from a first plane, the ribs extend in a front to back direction within the bedliner;

two side walls which extend upwardly from opposite sides of the bottom wall;

a front wall which extends upwardly from the bottom wall between the two side walls; and portions of the bottom wall which define a first transverse portion which extends generally adjacent to the first plane, permitting the first transverse portion to overlie a truck bed, wherein portions of a first group of a plurality of bottom wall ribs terminate adjacent the first transverse portion, and portions of a second group of a plurality of bottom wall ribs terminate adjacent the first transverse portion, the second group of ribs being positioned rearwardly from the first group of ribs, such that the first transverse portion of the bottom wall is defined between the first group and the second group and is adapted to overlie the truck bed, and wherein portions of the first transverse portion define a first opening which extends through the bottom wall, and through which a hitch mechanism is connectable to the truck bed.

2. The bedliner of claim 1 wherein a plurality of the ribs of the first group of bottom wall ribs has portions which define an inclined ramp which extends upwardly from the first transverse portion.

3. The bedliner of claim 2 wherein a plurality of the ribs of the second group of bottom wall ribs has portions which define an inclined ramp which extends upwardly from the first transverse portion.

4. The bedliner of claim 1 further comprising portions of the bottom wall which define a second transverse portion which extends generally adjacent to the first plane, permitting the second transverse portion to overlie a truck bed, wherein portions of a third group of a plurality of bottom wall ribs terminate adjacent the second transverse portion, the third group of ribs being positioned rearwardly from the second group of ribs, such that the second transverse portion of the bottom wall is defined between the second group and the third group and is adapted to overlie the truck bed, and wherein portions of the second transverse portion define a second opening which extends through the bottom wall such that portions of a hitch mechanism are connectable to the truck bed.

5. The bedliner of claim 4 wherein the first transverse portion has a first depth in the front to back direction, and the second transverse portion has a depth in the front to back direction which is less than the first depth.

6. A one-piece thermoformed thermoplastic truck bedliner for attachment to the bed of a truck, the bedliner comprising:

a bottom wall having a plurality of generally parallel ribs which extend upwardly from a first plane;

two side walls which extend upwardly from opposite sides of the bottom wall;

a front wall which extends upwardly from the bottom wall between the two side walls; and portions of the bottom wall which define a first transverse flat portion which extends generally adjacent to the first plane, permitting the first flat transverse portion to overlie a truck bed, wherein portions of a first group of a plurality of bottom wall parallel ribs terminate adjacent the first transverse flat portion, and portions of a second group of a plurality of bottom wall parallel ribs terminate adjacent the first transverse flat portion, the second group of ribs being positioned rearwardly from the first group of ribs, such that the first transverse flat portion of the bottom wall is defined between the first group and the second group and is adapted to overlie the truck bed, wherein a hitch mechanism may be attached through portions of the first flat transverse portion to connect to the truck bed.

7. The bedliner of claim 6 wherein a plurality of the ribs of the first group of bottom wall ribs has portions which define an inclined ramp which extends upwardly from the transverse flat portion.

8. The bedliner of claim 7 wherein a plurality of the ribs of the second group of bottom wall ribs has portions which define an inclined ramp which extends upwardly from the transverse flat portion.

9. The bedliner of claim 6 further comprising portions of the bottom wall which define a second transverse flat portion which extends generally adjacent to the first plane, permitting the second flat transverse portion to overlie a truck bed, wherein portions of a third group of a plurality of bottom wall parallel ribs terminate adjacent the second transverse flat portion, the third group of ribs being positioned rearwardly from the second group of ribs, such that the second transverse flat portion of the bottom wall is defined between the second group and the third group and is adapted to overlie the truck bed.

10. The bedliner of claim 9 wherein the first transverse flat portion has a first depth in the front to back direction, and the second transverse flat portion has a depth in the front to back direction which is less than the first depth.

11. A truck with an attached bedliner and fifth wheel hitch, comprising:

a truck having a truck bed;

a thermoformed thermoplastic truck bedliner mounted within the truck bed and having a bottom wall which overlies the truck bed, wherein a plurality of ribs extend upwardly from the bottom wall, the bedliner having side walls and a front wall which extend upwardly from the bottom wall, wherein portions of the bottom wall define a first transverse flat portion which extends generally adjacent to the truck bed, and wherein a plurality of the ribs extend frontwardly from the first transverse flat portion, and a plurality of ribs extend rearwardly from the first transverse flat portion, wherein portions of the bottom wall at the first transverse flat portion define a first opening which communicates with the truck bed, a ring of plastic generally adjacent to the truck bed being defined around the first opening; and a fifth wheel hitch which has portions which extend through the first opening and are connected to the truck bed.

12. The apparatus of claim 11 wherein a plurality of the ribs terminate adjacent the first opening to each define an inclined ramp which extends upwardly from the first transverse flat portion.

13. The apparatus of claim 11 wherein the bedliner further comprises portions of the bottom wall which define a second transverse flat portion which extends generally adjacent to the truck bed and which is spaced rearwardly from the first transverse flat portion, a plurality of bottom wall parallel ribs terminate adjacent the second transverse flat portion and wherein a second opening is defined by portions of the second transverse flat portion.

14. The apparatus of claim 13 wherein the first transverse flat portion has a first depth in the front to back direction, and the second transverse flat portion has a depth in the front to back direction which is less than the first depth.

15. The apparatus of claim 11 wherein the first opening comprises a bolt hole, and wherein the portions of the fifth wheel hitch extending through the bolt hole comprise a fastener.

16. A truck with an attached bedliner and fifth wheel hitch, comprising:

a truck having a truck bed;

a thermoformed thermoplastic truck bedliner mounted within the truck bed and having a bottom wall which overlies the truck bed, wherein a plurality of ribs extend upwardly from the bottom wall, the bedliner having side walls and a front wall which extend upwardly from the bottom wall, wherein portions of the bottom wall define a first transverse portion which extends generally adjacent to the truck bed, and wherein a plurality of the ribs extend frontwardly from the first transverse portion, and a plurality of ribs extend rearwardly from the first transverse portion, wherein portions of the bottom wall at the first transverse portion define a first opening which communicates with the truck bed, a ring of plastic being defined around the first opening that extends more closely to the truck bed than the portions of the ribbed bedliner outward of the first transverse portion; and a fifth wheel hitch which has portions which extend through the first opening and are connected to the truck bed.

17. The apparatus of claim 16 wherein the first opening comprises a bolt hole, and wherein the portions of the fifth wheel hitch extending through the bolt hole comprise a fastener.

* * * * *